United States Patent [19]

Asano et al.

[11] Patent Number: 5,429,457
[45] Date of Patent: Jul. 4, 1995

[54] ANNULAR CUTTER

[75] Inventors: Osamu Asano; Yutaka Tanaka, both of Tokyo, Japan

[73] Assignee: Nitto Kohki Co., Ltd., Tokyo, Japan

[21] Appl. No.: 336,094

[22] Filed: Nov. 7, 1994

Related U.S. Application Data

[62] Division of Ser. No. 267,253, Jun. 29, 1994.

[30] Foreign Application Priority Data

Jun. 30, 1993 [JP] Japan ................................. 5-183522
Jun. 30, 1993 [JP] Japan ................................. 5-183523

[51] Int. Cl.⁶ .................................................. B23B 51/04
[52] U.S. Cl. ..................................... 408/204; 408/226
[58] Field of Search ................. 408/204, 226, 240; 279/22, 30, 75, 81, 905

[56] References Cited

U.S. PATENT DOCUMENTS

| | | |
|---|---|---|
| 2,823,040 | 2/1958 | Fischer . |
| 2,906,541 | 9/1959 | DuBois . |
| 3,405,950 | 10/1968 | Cox . |
| 3,679,220 | 7/1972 | Reeves . |
| 3,708,178 | 1/1973 | Lauricella . |
| 3,747,946 | 7/1973 | Edens . |
| 4,184,692 | 1/1980 | Benson et al. ............... 408/226 |
| 4,188,041 | 2/1980 | Soderberg .................... 279/81 |
| 4,188,741 | 2/1980 | Levy . |
| 4,775,269 | 10/1988 | Brix . |
| 4,824,298 | 4/1989 | Lippacher et al. . |
| 5,281,060 | 1/1994 | Strange et al. ............... 408/204 |

FOREIGN PATENT DOCUMENTS

| | | |
|---|---|---|
| 62-74515 | 4/1987 | Japan . |
| 64-3603 | 1/1989 | Japan . |
| 1130670 | 7/1967 | United Kingdom . |
| 1204711 | 9/1970 | United Kingdom . |
| 1301580 | 12/1972 | United Kingdom . |
| 2131915 | 6/1984 | United Kingdom . |

Primary Examiner—Daniel W. Howell
Attorney, Agent, or Firm—Nixon & Vanderhye

[57] ABSTRACT

An annular cutter connecting apparatus includes an arbor, annular cutter fixing locking members received in holding holes formed in the lower end portion of the arbor and a sleeve member surrounding the lower end portion of the arbor, for fixing an annular cutter to the arbor. The sleeve has a first control face having an inner diameter equal to the outer diameter of the lower end portion of the arbor, for projecting the locking members into the central bore by a predetermined length when the first control face engages the locking members, and second control faces formed circumferentially in the first control face, for receiving the locking members. The sleeve is rotatable around its own axis so as to cause the locking members to selectively face the first control face and the second control faces, respectively. An annular cutter has a shank portion provided with locking member passing portion or portions on that part of the outer peripheral surface of the shank portion which corresponds to the holding holes of the annular cutter connecting apparatus. The shank portion has depressed locking member receiving portion formed in or on the locking member passing portion or portions and receive the locking members. The annular cutter is connected to and removed from the arbor in one-touch operation.

7 Claims, 5 Drawing Sheets

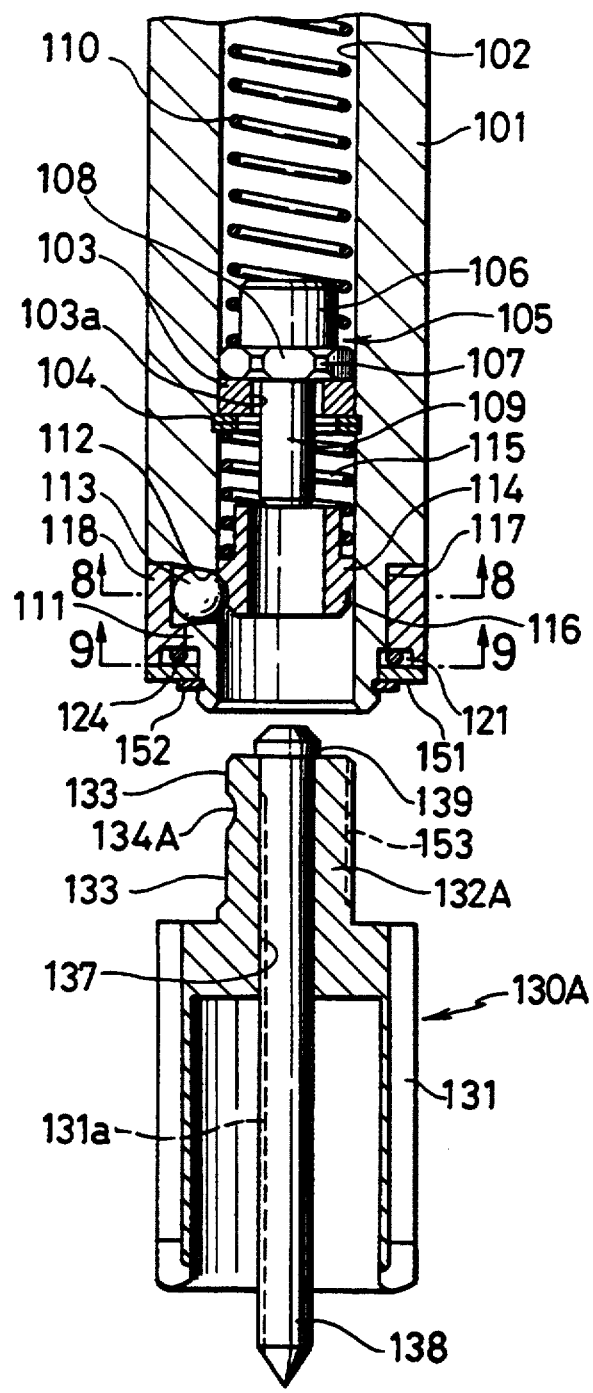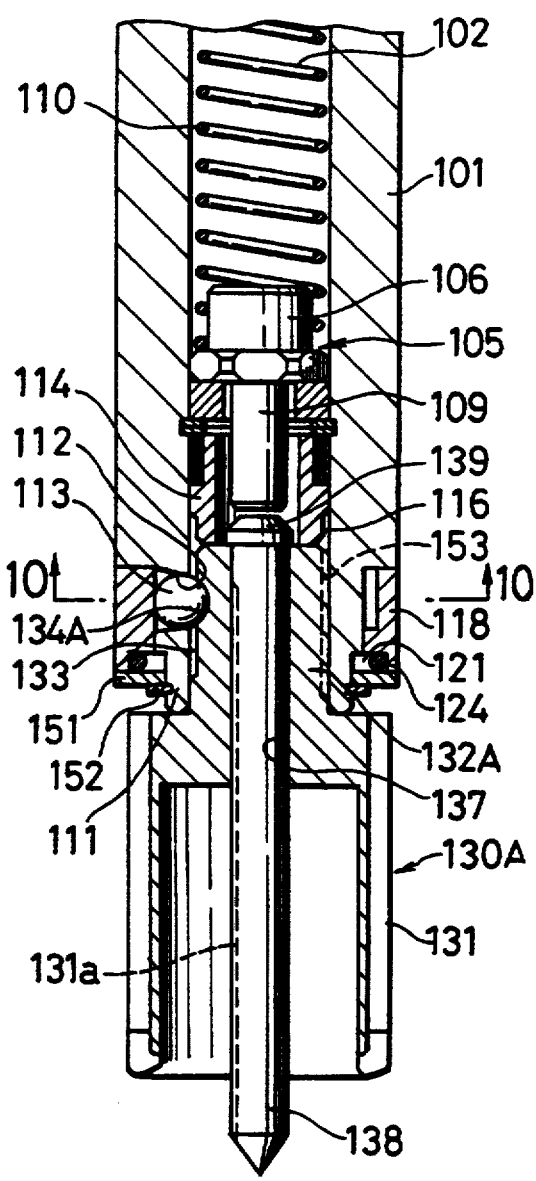
FIG. 4
FIG. 5

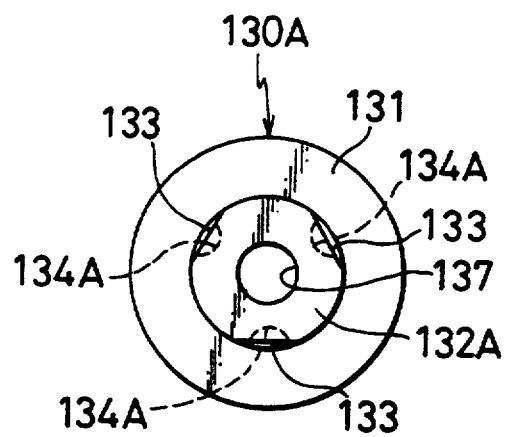
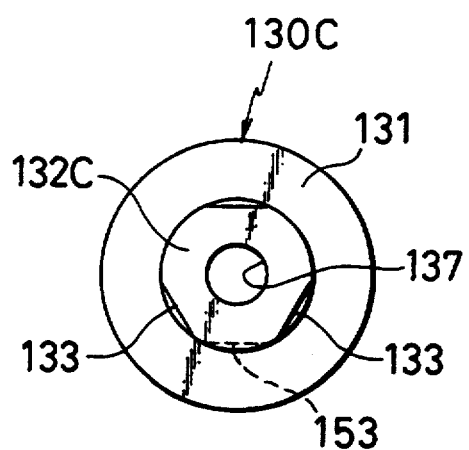
FIG. 11  FIG. 14
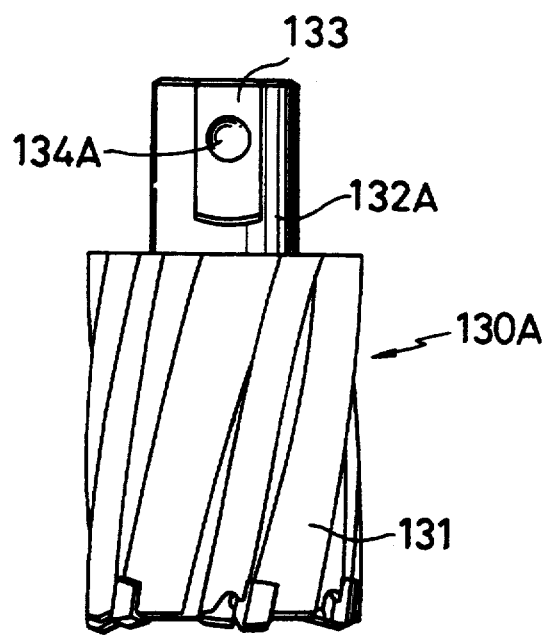
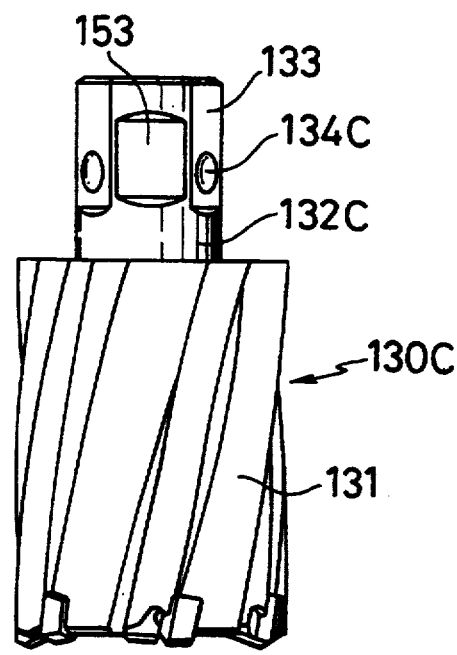
FIG. 12  FIG. 15

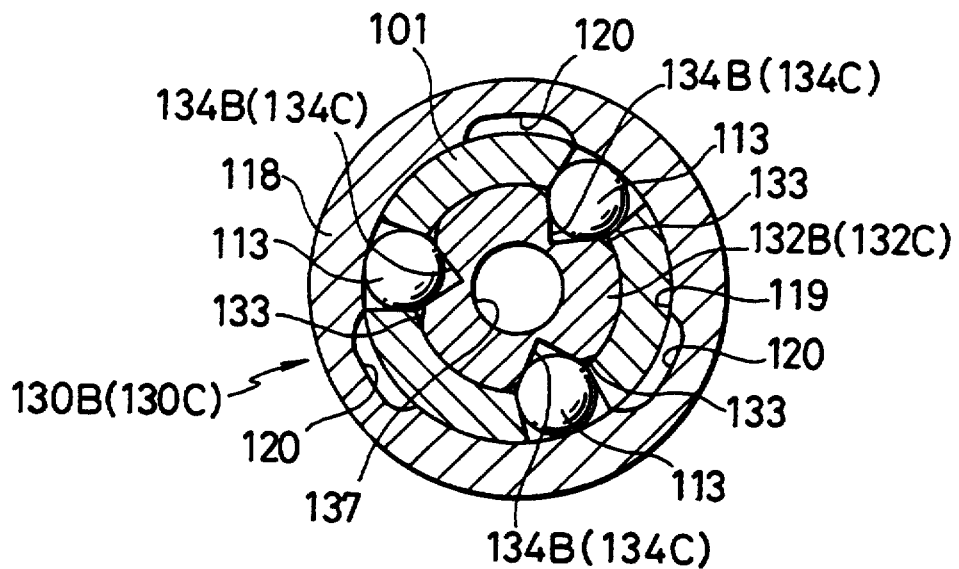
FIG. 13
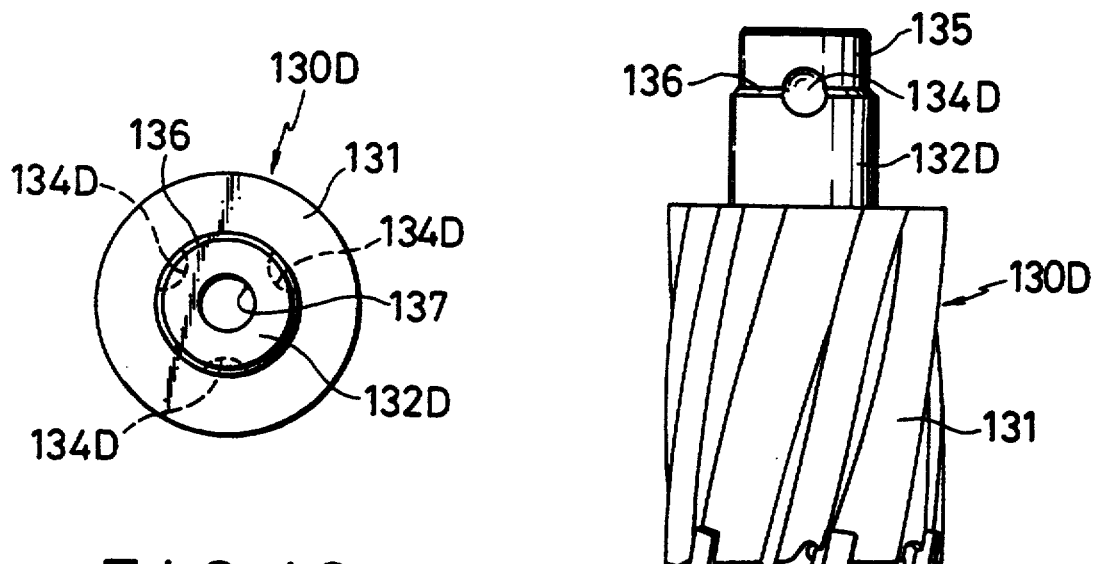
FIG. 16
FIG. 17

ANNULAR CUTTER

This is a divisional of application Ser. No. 08/267,253, filed Jun. 29, 1994.

BACKGROUND OF THE INVENTION

1. Field of the Invention

The present invention relates to an annular cutter connecting apparatus for connecting an annular cutter to a drilling machine used for drilling relatively deep holes in a workpiece made of a hard material, and an annular cutter connected by such a connecting apparatus to the drilling machine, and more particularly to an annular cutter connecting apparatus for connecting an annular cutter to a drilling machine with ease, receiving only an annular cutter suited for the drilling machine and preventing any annular cutter not suited therefor from being connected to the drilling machine, and such an annular cutter.

2. Description of the Related Art

The conventional drilling machine for drilling a workpiece made of a hard material generally forms holes by driving an annular cutter having downward directed blade edges at a constant rotational speed and feed. Upon drilling a workpiece made of a hard material on this drilling machine, it is necessary to change the annular cutter which is now used when it is not suited for the workpiece to be drilled.

There have been developed various annular cutter connecting apparatuses which facilitate replacement of annular cutters, and annular cutters which can be replaced easily. There are variety of annular cutter connecting apparatuses, the simplest type of which connects an annular cutter to an arbor by means of a blot, and a relative complicated type of which uses locking members such as balls for holding the arbor.

An annular cutter connecting apparatus which has a relative complicated structure as disclosed in Japanese Laid-open Patent Application 62-74515 will be described with reference to FIGS. 1 and 2.

A conventional annular cutter 1 connected to an arbor 2 of a drilling machine (not shown) and transmits the rotation and the feed required for drilling operation from the drilling machine to an annular cutter 8. A cylindrical rotation transmitting member 3 is irrotationally connected to the arbor 2 by means of a key 4. A plurality of holding holes 6 for holding fixing balls 5 are formed in the lateral wall of the lower portion of the rotation transmitting member 3 so as to be directed toward the axis of the rotation transmitting member 3.

On an intermediate portion of the inner peripheral surface of the rotation transmitting member 3 are formed a plurality of engaging portions 7 (FIG. 2) which extend toward the central axis of the member 3 and transmit rotation from the rotation transmitting member 3 to the annular cutter 8. A pushing sleeve 9 for pushing the fixing balls 5 toward the central axis of the rotation transmitting member 3 surrounds the rotation transmitting member 3 so as to be slidable axially thereof. Between the pushing sleeve 9 and the rotation transmitting member 3 is provided a compression coil spring 10 for urging the pushing sleeve 9 downward. The pushing sleeve 9 is held by a holding ring 11 fixed to the outer peripheral surface of the rotation transmitting member 3 so that the pushing sleeve 9 is prevented from slipping off the rotation transmitting member 3.

The annular cutter 8 has a downwardly open cylindrical body having a plurality of blades (not shown) formed on the lower end thereof. On the upper end of the cylindrical body is formed a cylindrical shank portion 12 inserted in the lower portion of a cylindrical central hole (hereinafter referred to as the "fixing hole") formed by the inner peripheral surface of the rotation transmitting member 3. Axially projecting portions 13 engageable with the engaging portions 7 are formed on the upper end of the shank portion 12. An annular groove 14 for receiving the fixing balls 5 is formed in an intermediate portion of the outer peripheral wall of the shank portion 12.

A center pin 15 for determining the drilled position axially slidably passes through the central hole of the annular cutter 8. An annular engaging groove 16 for receiving engaging balls 17 is formed in the upper end portion of the center pin 15. The annular cutter 8 is connected to the arbor 2 in the fixing hole by pushing the engaging balls 17 into the engaging groove 16. The center pin 15 is urged downward by a compression coil spring 18 through the balls 17, and a sealing member 19 is abutted against the upper shoulder of another annular groove 20 so as to prevent cutting oil from flowing downward from the cylindrical central hole in the arbor 2, when the center pin 15 is not in use. During the drilling operation, however, the lower end tip of the center pin 15 is pressed against a to-be-drilled workpiece (not shown) made of a hard material, and the center pin 15 is pushed in the fixing in the rotation transmitting member 3 against the urging force of the compression coil spring 18. Accordingly, the sealing member 19 is released from the shoulder of the annular groove 20 of the annular cutter 8, and the cutting oil is supplied from the cylindrical hole of the arbor 2 to the blade edges of the annular cutter 8, whereby the drilling operation is performed smoothly.

The annular cutter 8 is fixed to the rotation transmitting member 3 in the following way. First, the pushing sleeve 9 is moved upward against the urging force of the compression coil spring 10. Next, the shank portion 12 of the annular cutter 8 is inserted into the fixing hole of the rotation transmitting member 3 until the projecting portions 13 engage the engaging portions 7. In this state, the pushing portion 21 of the pushing sleeve 9 is displaced from the fixing balls 5, and the fixing balls 5 face the cylindrical ball-escaping hole 22 of the sleeve 9 so that the balls 5 are movable radially outward. Thus, the shank portion 12 of the annular cutter 8 is inserted freely in the cylindrical hole of the rotation transmitting member 3.

When the annular cutter 8 is fully inserted in the rotation transmitting member 3, the pushing sleeve 9 is released. Then, the pushing sleeve 9 is moved downward by the urging force of the compression coil spring 10 and pushes the fixing balls 5 into the annular groove 14 of the shank portion 12. In this way, the annular cutter 8 is fixed to the rotation transmitting member 3.

Upon drilling a workpiece made of a hard material, the annular cutter now on the drilling machine must be replaced by an annular cutter having a diameter suited for holes to be formed, if the annular cutter now on the drilling machine does not have such a suitable diameter.

However, the conventional annular cutter connecting apparatus can connect any annular cutter to the arbor so long as the inner diameter of fixing hole of the rotation transmitting member corresponds to the outer diameter of the shank portion of the annular cutter and the annular groove coincides with fixing balls. Thus, an annular cutter not suited for the driving capability of a drilling machine and for the material of a workpiece is sometimes connected to the arbor 2 mistakenly. If the drilling operation continues without noticing this mistake, unexpected high cutting resistance is produced during the drilling operation. As a result, the driving mechanism of the drilling machine tends to be damaged and/or the blade edges of the annular cutter 8 are apt to be broken.

In case where only blade edges are broken, this problem can be solved by replacing the annular cutter 8 with a suitable one. When, however, the driving mechanism of the drilling machine is broken, the drilling operation must be interrupted for a long time in order to repair the driving mechanism, deranging the production plan. When the annular cutter 8 is not suited for the material of a workpiece, burrs tend to be produced to lower the dimensional accuracy of the formed holes, even if the holes can be formed. As cut chips are wound around the annular cutter 8, the pushing sleeve 9 is sometimes pushed up against the urging force of the compression coil spring 10, and the annular cutter 8 is apt to be adversely loosened or removed from the arbor 2.

When the annular cutter 8 is fixed to the arbor 2 as shown in FIG. 2, the pushing sleeve 9 is lowered so that the annular cutter fixing balls 5 coincide with the escaping hole 22 formed in the lower end portion of the pushing sleeve 9 and are set in a waiting state in the escaping hole 22. In the conventional annular cutter connecting apparatus 1 of a general type, part of each ball 5 projects from the inner peripheral surface of the rotation transmitting member 3 into a central bore defined by the inner peripheral surface of the rotation transmitting member 3 (FIG. 1). Flat faces 23 each having a depth corresponding to the extended amount of each ball 5 into the central bore are formed on the parts of the outer peripheral surface of the shank portion 12 of the annular cutter 8, which parts extend from the annular groove 14 to the upper end of the shank portion 12. When the shank portion 12 is fixed to the arbor 2, the flat faces 23 align with the corresponding balls 5, and then the shank portion is pushed into the central bore.

Any annular cutter can be connected to the arbor 2 so long as the annular cutter is provided with a shank portion 12 having an outer diameter corresponding to the inner diameter of central hole of the arbor 2 and flat faces 23 for receiving the balls 5 extending from the holding holes 6 into the central hole. Thus, the subject matter in that only a suitable annular cutter can be fixed to a specific arbor cannot be achieved by the conventional annular cutter 1.

Japanese Examined Utility Model Application No. 64-3603 discloses one of the conventional annular cutter connecting apparatus which uses a bolt by which an annular cutter is connected to an arbor. This conventional apparatus will be described with reference to FIG. 3. The shank portion 24 of an annular cutter is inserted in the central bore 26 of an arbor 25. Then, a fixing bolt 27 provided in the arbor 25 is turned to engage a flat face 28 formed on the lateral wall of the shank portion 24, and the annular cutter is connected to the arbor 25. The center $O_1$ of the shank portion 28 should coincide with the center $O_2$ of the receiving hole 26 of the arbor 25. Actually, however, slight manufacturing errors of the shank portion 24 and the receiving hole 26 and/or fitting tolerances between them produce a center displacement $\delta$ ranging from 1/100 to 1/50 mm. This displacement provides eccentricity of the annular cutter, giving an adverse effect to the annular cutter.

SUMMARY OF THE INVENTION

The first object of the present invention is to provide an annular cutter connecting apparatus which connects to a drilling machine only an annular cutter suited for the drilling machine and prevents a pushing sleeve of the apparatus from being loosened or removed even when cut chips are wound around the pushing sleeve during the drilling operation.

The second object of the present invention is to provide an annular cutter to be connected to a drilling machine by means of such an annular cutter connecting apparatus.

In order to achieve the first object of the present invention, an annular cutter connecting apparatus comprises an arbor including cylindrical one end portion having an outer diameter, a central bore and a plurality of holding holes arranged circumferentially in the end portion, locking members received in the receiving holes, for connecting an annular cutter to the arbor, and a sleeve rotatably surrounding the end portion of the arbor. The sleeve is provided with a first control face having an inner diameter equal to the outer diameter of the end portion of the arbor, for extending the locking members by a predetermined length from the receiving holes into the central bore when the first control face engages the locking members. The sleeve is further provided with second control faces formed in the first control face and arranged circumferentially thereof, for receiving the balls in such a manner that the balls are held in the holding holes in a state in which the balls are cleared off the central bore of the arbor. The first control face and the second control faces are arranged so that the balls selectively engage the first control face and the second control faces. Upon connecting an annular cutter to the arbor, locking member passing means formed on the outer peripheral surface of the shank portion of the annular cutter is made to pass through the regions of the locking members, and the locking members are engaged with depressed locking member receiving portions formed in or on the locking member passing means.

In order to achieve the second object of the present invention, an annular cutter comprises a substantially hollow cylindrical blade portion having one end, a shank portion coaxially formed on the end of the blade portion having a lateral side, locking member passing means formed on the lateral side of the shank portion and depressed locking member receiving portions formed in or on the locking member passing means and arranged circumferentially thereof.

BRIEF DESCRIPTION OF THE DRAWINGS

FIG. 4 is a longitudinal cross-sectional view of the main part of an annular cutter connecting apparatus according to one embodiment of the present invention in which an annular cutter to be connected the arbor of the apparatus is separated from the apparatus;

FIG. 5 is a longitudinal cross-sectional view of the main part of the annular cutter connecting apparatus of FIG. 4 with the annular cutter connected to the arbor;

FIG. 11 is a front view of a first embodiment of an annular cutter according to the present invention;

FIG. 12 is a side view of the annular cutter of FIG. 11;

FIG. 13 is a transversal cross-sectional view of second and third embodiments of annular cutters according to the present receiving portions;

FIG. 14 is a front view of the third embodiment of the annular cutter according to the present invention;

FIG. 15 is a side view of the third embodiment of the annular cutter;

FIG. 16 is a front view of a fourth embodiment of an annular cutter according the present invention; and FIG. 17 is a side view of the annular cutter of FIG. 16.

DETAILED DESCRIPTION OF THE PREFERRED EMBODIMENTS

Figure 1:
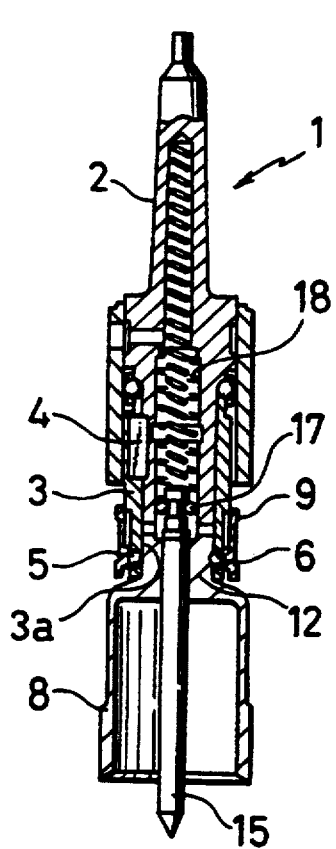
FIG. 1 is a longitudinal cross-sectional view of a conventional annular cutter connecting apparatus.
Figure 2:
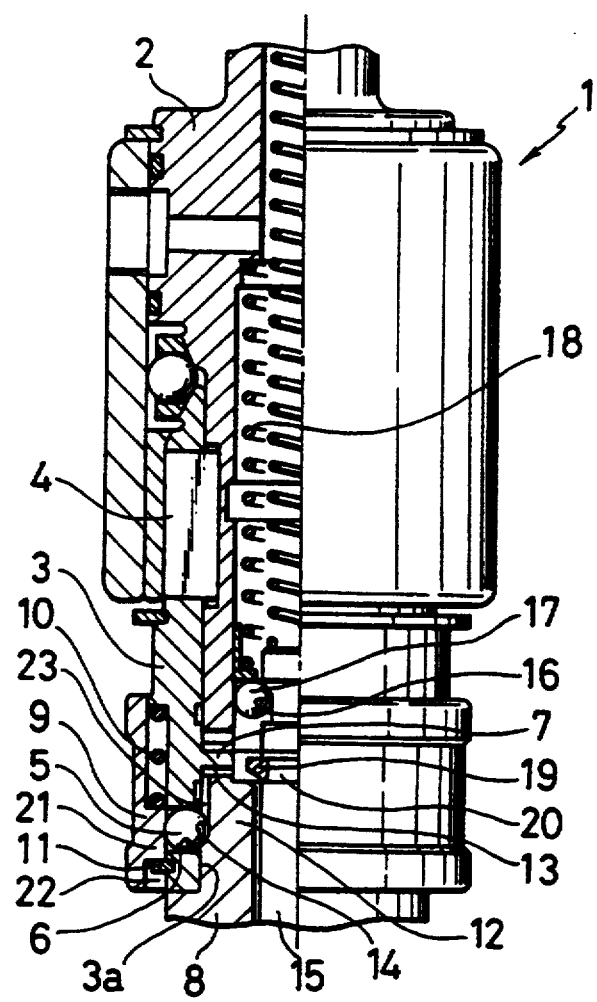
FIG. 2 is a side view of the main part of the annular cutter connecting apparatus of FIG. 1.
Figure 3:
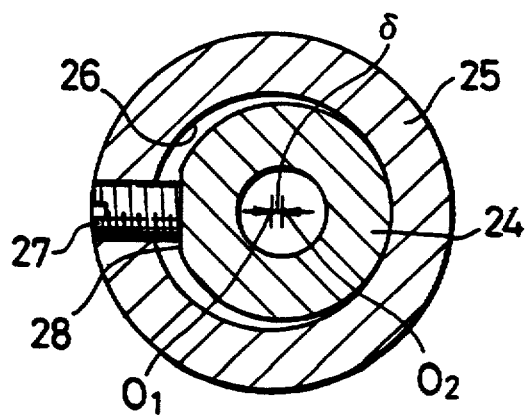
FIG. 3 is a transversal cross-sectional view of the fixing portion of another conventional annular connecting apparatus using a fixing bolt with an annular cutter fixed thereto.

An annular cutter connecting apparatus and an annular cutter according to the present invention will be described by way of preferred embodiments with reference to the accompanying drawings.

First, the annular cutter connecting apparatus according to the present invention will be described.

As shown in FIGS. 4 and 5, a rotational speed and a feed required for drilling operation is transmitted from a drilling machine (not shown) to an arbor 101 connected thereto. The arbor 101 is formed with a cylindrical central bore 102 to which cutting oil is supplied from the drilling machine through an oil passage (not shown).

A seal member 103 is set in position by a retaining ring 104 in the lower portion of the central bore 102. A valve body 105 for opening and closing oil paths comprises a head portion 106, a flange portion 107 formed at the side of the seal member 103 and formed with oil grooves 108 and a rod portion 109 coaxially extending downward from the flange portion 107 and idly fitted in the central hole 103a of the seal member 103.

In the non-operative condition, the flange portion 107 is pressed against the seal member 103 by the urging force of a compression coil spring 110 provided in the central bore 102, thereby preventing the cutting oil from leaking downward from the central hole 102. The valve body 105, the seal member 103 and the compression coil spring 110 constitute a valve for opening and closing the oil paths.

During the drilling operation, the center pin 138 of each of annular cutters 130A, 130B, 130C and 130D which will be described later in detail is pressed against a workpiece and is lifted up. The head portion 139 formed on the upper end of the center pin 138 abuts against the lower end of the rod portion 109 of the valve body 105 and raises it. The flange portion 107 is separated from seal member 103 against the urging force of the compression coil spring 110. As a result, the cutting oil flows down through the oil passages 108, spaces formed between the flange potion 107 and the seal member 103 and between the inner peripheral surface of the central hole of the seal member 103 and the outer peripheral surface of the rod portion 109 and reaches the edges of the blade portion 131.

Holding holes 112 for receiving locking members for fixing the annular cutter 130A (balls 113 in this embodiment and hereinafter referred to as the "fixing balls 113") are circumferentially arranged in the lower end portion 111 of the arbor 101. Each holding hole 112 may have the same inner diameter throughout the whole depth, but it is preferred that the inner wall of the holding hole 112 be tapered so that the inside inner diameter at the inner end of the hole 112 is smaller than the outside inner diameter at the outer end thereof. This prevents the balls 113 from falling in the central bore 102 of the arbor 101.

A substantially hollow cylindrical supporting member 114 is axially slidably fitted in the lower end portion of the central bore 102 and is urged downward by the urging force of a compression coil spring 114 provided between the supporting member 114 itself and the retaining ring 104. In the outer peripheral wall of the lower end portion of the supporting member 114 is formed an annular neck 116 having a smaller outer diameter than the remaining part of the outer peripheral wall, for receiving the fixing balls 113 which partially project from the holding holes 112 toward the central bore 102. The depth of the annular neck 116 is shown by E in FIG. 8.

Figure 6:
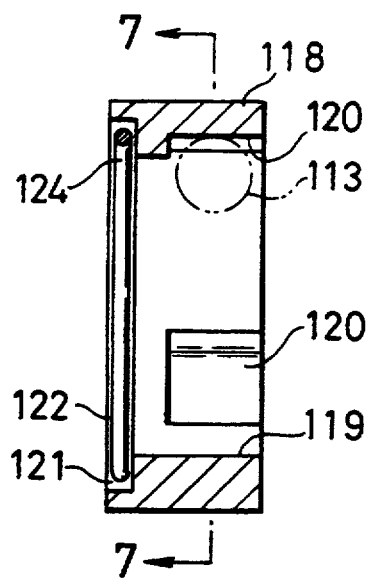
FIG. 6 is a longitudinal cross-sectional view of the pushing sleeve of the annular cutter connecting apparatus of FIG. 4.
Figure 7:
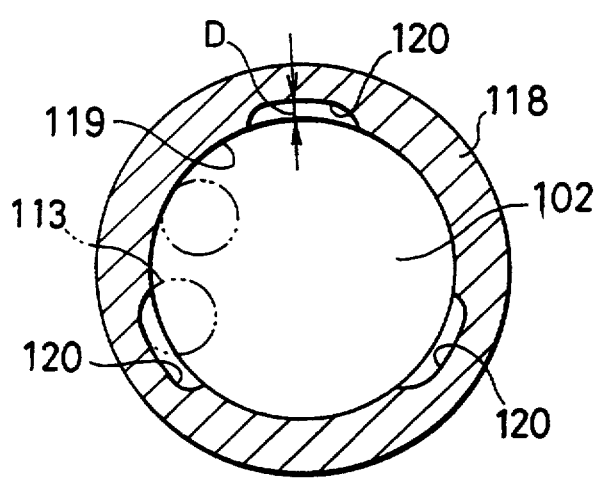
FIG. 7 is a cross-sectional view along line 7—7 in FIG. 6.

The outer peripheral surface 117 of the lower end portion 111 of the arbor 101 is reduced in diameter and an annular cutter fixing sleeve 118 is fitted thereon. As shown in FIGS. 6 and 7, the sleeve 118 comprises a cylindrical first control face 119 defined by the inner peripheral surface of the sleeve 118 and having an inner diameter equal to the outer diameter of the lower portion 111 of the arbor 101, and second control faces 120 forming shallow U-shaped depressions arranged circumferentially in the first control face 119. A ring-shaped return spring chamber 121 formed in the end of the sleeve 118 which end becomes the lower end of the sleeve 118 when it is attached to the arbor 101. In this embodiment, three second control faces 120 are arranged circumferentially equidistantly arranged in the first control face 119. The number of the second control faces is not limited to three. However, three are the most suitable because the shank portion of the annular cutter is supported most stably by the three second control faces 120. The second control faces 120 may be circumferentially arranged at irregular intervals, but it is preferable that they be arranged regularly so that they receive equal loads.

Figure 8:
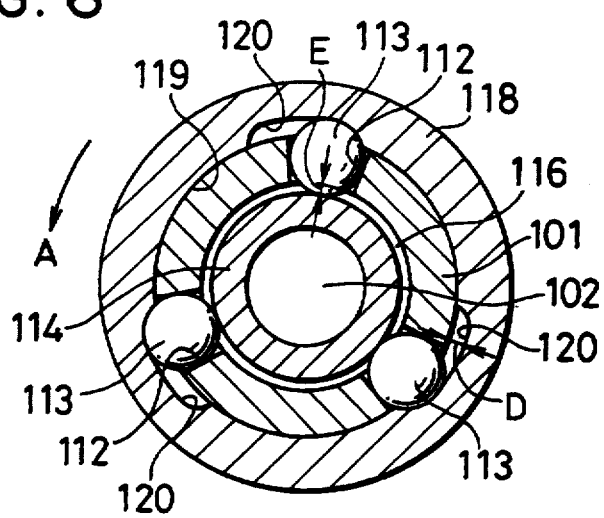
FIG. 8 is a cross-sectional view along line 8—8 in FIG. 4.
Figure 9:
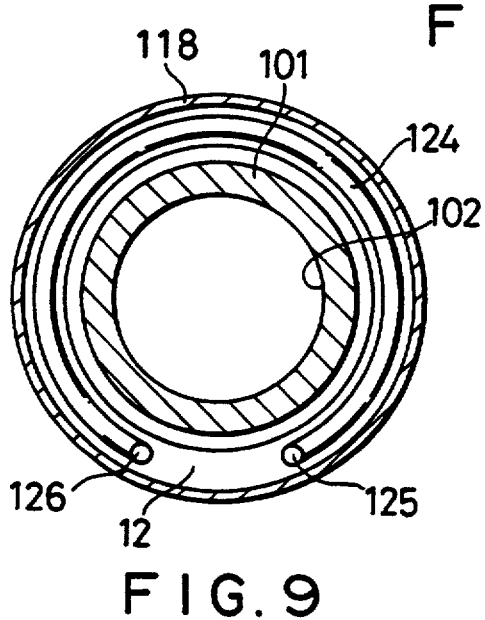
FIG. 9 is a cross-sectional view along line 9—9 in FIG. 4.
Figure 10:
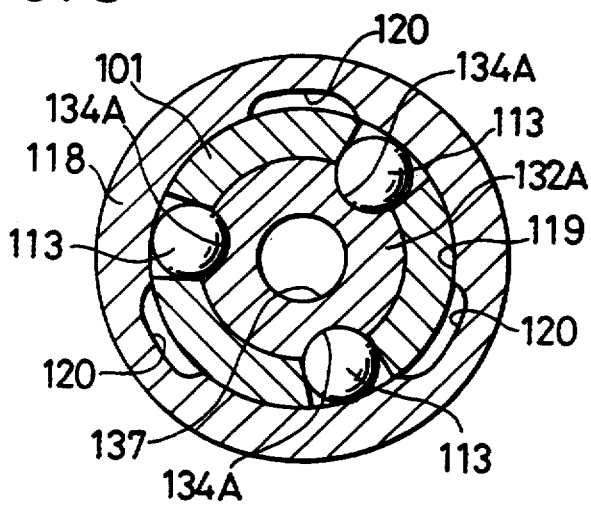
FIG. 10 is a cross-sectional view along line 10—10 in FIG. 5.

The first control face 119 pushes the fixing balls 113 and causes parts of the fixing balls 113 to project from the holding holes 112 deep into the central bore 102. The sleeve 118 can be rotated in the direction of an arrow A as shown in FIG. 8. In a non-operative condition, the sleeve 118 assumes the rotated state in the direction of the arrow A by means of the a return spring 124 as shown in FIG. 8. In this state, the fixing balls 113 are in contact with the corresponding second control faces 120 and are received by the neck portion 116 of the supporting member 114. Thus, they are at the waiting position as shown in FIG. 4.

Referring to FIGS. 4 and 5, the return spring chamber 121 is covered with a ring cover 151 held on the lower end of the outer peripheral wall of the arbor 101 by a holding ring 152.

As shown in FIGS. 4 to 6 and 9, a substantially C-shaped return spring 124 is housed in the return spring chamber 121. One end 125 of the return spring 124 is fixed to the arbor 101 and the other end 126 thereof is fixed to the sleeve 118, and the sleeve 8 is always urged in the direction of the arrow A in FIG. 8 so as to push the fixing balls 113 into the central bore 102.

Next, embodiments of annular cutters according to the present invention will be described.

FIG. 11 and 12 show a first embodiment of an annular cutter 130A according to the present invention which comprises a substantially hollow cylindrical blade portion 131 having the open lower end and a cylindrical shank portion 132A formed coaxially on its upper end. On the lateral side of the shank portion 132A are formed flat faces 133 arranged circumferentially at equal intervals. A depressed ball receiving portion 134A forming a hemispherical depression for receiving the respective fixing ball 113 is formed in each flat face 133. The depressed ball receiving portion 134A is an example of a locking member receiving portion for connecting an annular cutter to an arbor.

FIG. 13 is a transversal cross-sectional view showing a second annular cutter 130B in a state in which it is connected to the arbor 101. A cylindrical shank portion 132B is coaxially formed on the upper end of a blade portion 131 having the same structure of the blade portion 131 of the first embodiment of the annular cutter 130A, and flat faces 133 are formed on the lateral side of the shank portion 132B in the same manner as the flat faces 133 on the shank portion 132A of the first embodiment of the annular cutter 130A. A ball receiving portion 134B having a conical shape in a horizontal cross section is formed in each flat face 133. The ball receiving portion 134B is also an example of the locking member receiving portion.

FIGS. 14 and 15 show a third embodiment of an annular cutter 130C of the present invention. Its shank portion 132C has the same structure as the shank portion 132A of the first embodiment of the annular cutter 130A (the shank portion 132A having the hemispherically depressed ball receiving portions 134A) or the shank portion 132B of the second embodiment of the annular cutter 130B (the shank portion 132B having the conically depressed ball receiving portions 134B). Another flat face 153 is formed on the portion of the outer peripheral surface of the shank portion 132C between adjacent two flat faces 133. The flat face 153 is shown by broken lines in FIGS. 4 and 5. The other structure is the same as that of the first and second embodiments of the annular cutters 130A and 130B. The annular cutter 130C can be connected to an arbor by means of a conventional annular cutter connecting apparatus by using the flat face 153 as a passing portion.

FIG. 13 also shows a transversal cross section of the third embodiment of the annular cutter 130C having conically depressed ball receiving portions in a state in which the annular cutter 130C is connected to the arbor 101. The annular cutter, the shank portion and the conically depressed ball receiving portions of the third embodiment are shown by (130C), (132C) and (134C), respectively, in FIG. 13.

FIGS. 16 and 17 show a fourth embodiment of an annular 130D which has a blade portion 131 having the same structure as that of the first embodiment of the annular cutter 130A. A cylindrical guide portion 135 is coaxially formed on the upper end of the shank portion 132D provided on the upper end of the blade portion 131. The guide portion 135 has an outer diameter reduced from the outer diameter of the shank portion 132D so that it does not hit against the fixing balls 113 when the shank portion 132D is inserted in the central bore 102 of the arbor 101. Hemispherically depressed ball receiving portions 134D are formed circumferentially in a step portion 136 defined between the upper end of the shank portion 132D and the lower end of the guide portion 135. The depressed ball receiving portion 134D is also an example of the locking member receiving portion.

In the embodiments described above, the flat faces 133 and guide portion 135 constitute locking member passing means, and the locking member passing means and the locking member receiving portions constitute engaging portions.

The number, the positions and sizes of the flat faces 133 of the annular cutter 130A and 130B, and the guide portions 135 and the ball receiving portions 134A, 134B, 134C and 134D of the annular cutters 130C and 130D correspond to the number, the positions and the size of the fixing balls 18 when the shanks of the annular cutter are fully inserted in the central bore 102 of the arbor 101 (FIG. 5). Because of this arrangement, only the specific annular cutters 132A, 132B, 132C and 132D can be connected to the arbor 101 but other annular cutters cannot be connected thereto. Each of the shank portions of the first to fourth embodiments of the annular cutters has three ball receiving portions arranged circumferentially equidistantly. However, the shank portion may have a polygonal cross section.

As shown in FIGS. 5 and 6, the center pin 137 for setting a to-be-drilled position extends through the center hole of the annular cutter 130A so as to be movable axially. On the upper end of the center pin 138 is formed a head 139 having a larger outer diameter than the outer diameter of the center pin 138 so as to prevent the center pin 138 from slipping off the central hole 137 of the annular cutter 130A. As described above, the point formed on the lower end of the center pin 138 abuts against a workpiece which is being drilled, and the center pin 138 is lifted. The valve body 105 for opening and closing the oil passage is lifted by the head 139 of the center pin 138 to allow the cutting oil in the arbor 101 to flow down to the edges of the blades formed on the blade portion 131 of the annular cutter 130A. Each of the second to fourth embodiments of the annular cutters 130B, 130C and 130D is provided with a center pin having the same structure as that of the first embodiment of the center pin 138.

Operation

First, the processes of how to fix the annular cutters to the arbors will be described.

The shank portion 132A of the annular cutter 130A is inserted from below in the central bore 102 of the arbor 101 which is in a state shown in FIGS. 4 and 8. As the shank portion 132A is inserted, the supporting member 114 is lifted by the shank portion 132A and disengaged from the fixing balls 113. The fixing balls 113 roll on the flat faces 133 and engage the ball receiving portions 134A provided in the shank portion 132A at the final stage of the insertion. At the same time, the sleeve 118 is rotated in the direction of the arrow A in FIG. 8 by the urging force of the return spring 124. As a result, the fixing balls 113 contact the first control face 119 and are firmly pushed in the ball receiving portions 134A. Thus, the annular cutter 130A is connected to the arbor 101 in one-touch operation, as shown in FIG. 5.

Upon the connection of the first embodiment of the annular cutter 130A to the arbor 101, the upper end of the shank portion 132A reaches the region of the fixing balls 113, as the shank portion 132A is inserted in the central bore 102 of the arbor 101. When the flat faces 133 of the shank portion 132A are axially aligned with the fixing balls 113, the fixing balls 113 engage the ball receiving portions 134A by merely pushing the annular cutter 130A in the central hole. When, on the other hand, the flat faces are not axially aligned with the fixing balls 113, the upper end of the shank portion 132A hits against the fixing balls 113, and no further insertion of the shank portion 132A is permitted. However, after the flat faces 133 have been aligned with the fixing balls 113 by rotating the annular cutter 130A around its own axis, the annular cutter 130A can be inserted further, enabling the fixing balls 113 to be engaged with the ball receiving portions 134A easily so that the connection of the annular cutter 130A to the arbor 101 is completed.

The second and third embodiments of the annular cutters 130B and 130C can be connected to the arbor 101 in the same way as the first embodiment of the annular cuter 130A. As described above, the third embodiment of the annular cutter 130C can be connected to the arbor by means of a conventional annular cutter connecting apparatus.

In an aligned state, the fourth embodiment of the annular cutter 130D is fully inserted in the central hole 102 of the arbor 101, and the balls 113 are fitted in the ball receiving portions 134D, whereby the annular cutter 130D is connected to the arbor 101. In a misaligned state, however, the step portion 136 of the shank portion 134D hits against the fixing balls 113, as the shank portion 134D is inserted in the central bore 102 of the arbor 101. In this case, the cutter 130D is rotated around its own axis to axially align the receiving portions 134D with the fixing balls 113. Thereafter, the shank portion 132D is further inserted in the central bore 102 of the arbor 101 so that the fixing balls 113 engage the ball receiving portions 134D. In this way, the annular cutter 130D is connected to the arbor 101.

The three point support attained by the balls 113 of the first to fourth embodiment 130A, 130B, 130C and 130C ensures accurate transmission of the rotation and the rotational force from the arbor 101 to the annular cutters 130A, 130B, 130C and 130D and prevention of center displacement between the annular cutter and the arbor 101, leading to accurate drilling operation. The reception of the balls 13 in the ball receiving portions of the shank portion of the annular cutter according to the present invention allows the annular cutter to be moved slightly upward and downward repeatedly due to the cutting resistance or the like during the drilling operation so that cut chips are broken into small pieces, the drilling efficiency is improved and the life of the annular cutter is prolonged.

As apparent from the above description, only an annular cutter having locking member passing means whose size and arrangement are suited for an annular cutter connecting apparatus which is now to be used can be connected to an arbor, but an unsuitable annular cutter is prevented from being connected thereto. Even when long chips are produced and wound around the sleeve 118 thereby lifting the sleeve 118, the sleeve 118 is not rotated in the direction in which the annular cutter is released from the annular cutter connecting apparatus. Thus, the annular cutter is not loosened or removed by such chips from the arbor 101.

The annular cutter is removed from the arbor 101 in the following way.

The sleeve 118 of the annular cutter 130A is manually rotated in the direction opposite to the direction of the arrow A in FIG. 8, and the second control faces 120 are caused to face the fixing balls 113. Then, the annular cutter 130A is pushed downward by the urging force of the compression coil spring 115 and automatically slips off the arbor 101. Thus, the removal of the annular cutter 130A from the arbor 101 can also be performed in one-touch operation, although it is necessary to hold the annular cutter 130A during its removal in order to avoid dropping of the annular cutter 130A. As the annular cutter 130A is pushed out of the arbor 101, the supporting member 114 is lowered by the urging force of the compression coil spring 115, and finally the fixing balls 113 are held by the annular neck 116. In this way, the annular cutter connecting apparatus is returned to the original state as shown in FIG. 4. The removing operation is applicable to the other embodiments of the annular cutters 130B, 130C and 130D.

What is claimed is:
1. An annular cutter comprising:
   a substantially cylindrical blade portion having one end;
   a shank portion having a lateral side and two ends and coaxially connected at one of said two ends to said one end of said blade portion;
   locking member passing means formed on said lateral side of said shank portion; and
   depressed locking member receiving portions formed in said side of said shank portion and in or at said locking member passing means.

2. An annular cutter according to claim 1, wherein said locking member passing means comprises flat faces formed on and arranged circumferentially of said side of said shank portion, and said depressed locking member receiving portions are formed in said flat faces.

3. An annular cutter according to claim 2, wherein said depressed locking member receiving portions are hemispherical.

4. An annular cutter according to claim 2, wherein said depressed receiving portions are conical.

5. An annular cutter according to claim 1, wherein another flat portion for passing a locking member of a conventional annular cutter connecting apparatus is formed on said outer peripheral surface of said shank portion between two adjacent ones of said flat portions.

6. An annular cutter according to claim 1, wherein said locking member passing means comprises a cylindrical guide portion having a smaller outer diameter than said shank portion and formed on said other end of said shank portion, an annular step portion in which said depressed locking member receiving portions is defined between said shank portion and said guide portion.

7. An annular cutter according to claim 6, wherein said depressed locking member receiving portions are hemispherical.

* * * * *

(12) EX PARTE REEXAMINATION CERTIFICATE (6328th)
United States Patent
Asano et al.

(10) Number: US 5,429,457 C1
(45) Certificate Issued: Jul. 29, 2008

(54) ANNULAR CUTTER

(75) Inventors: Osamu Asano, Tokyo (JP); Yutaka Tanaka, Tokyo (JP)

(73) Assignee: Nitto Kohki Co., Ltd., Ota-Ku, Tokyo (JP)

Reexamination Request:
No. 90/008,345, Jan. 12, 2007

Reexamination Certificate for:
Patent No.: 5,429,457
Issued: Jul. 4, 1995
Appl. No.: 08/336,094
Filed: Nov. 7, 1994

Related U.S. Application Data

(62) Division of application No. 08/267,253, filed on Jun. 29, 1994, now Pat. No. 5,427,482.

(30) Foreign Application Priority Data

Jun. 30, 1993 (JP) ............................................. 5-183522
Jun. 30, 1993 (JP) ............................................. 5-183523

(51) Int. Cl.
*B23B 51/04* (2006.01)

(52) U.S. Cl. ........................................ 408/204; 408/226
(58) Field of Classification Search .................. None
See application file for complete search history.

(56) References Cited

U.S. PATENT DOCUMENTS

| | | | |
|---|---|---|---|
| 2,255,334 A | 9/1941 | Scheiwer |
| 3,747,946 A | 7/1973 | Edens |
| 4,107,949 A | 8/1978 | Wanner et al. |
| 4,123,074 A | 10/1978 | Wanner |
| 4,452,554 A | 6/1984 | Hougen |
| 4,577,875 A | 3/1986 | Miyakawa |
| 4,626,152 A | 12/1986 | Palm |
| 4,824,298 A | 4/1989 | Lippacher et al. |
| 5,076,371 A | 12/1991 | Obermeier et al. |
| 5,199,508 A | 4/1993 | Miyanaga |
| 5,437,465 A | 8/1995 | Vögele et al. |

FOREIGN PATENT DOCUMENTS

| | | |
|---|---|---|
| DE | 37 27 799 | 3/1989 |
| DE | 94 07 575.1 | 10/1994 |
| GB | 1 204 711 | 9/1970 |
| GB | 1 301 580 | 12/1972 |
| GB | 1 603 885 | 12/1981 |

(Continued)

OTHER PUBLICATIONS

An opposition filed in the German Patent Office dated Dec. 11, 2003.
A decision by the German Federal Patent Court dated Nov. 24, 2005.

*Primary Examiner*—Joseph A. Kaufman

(57) ABSTRACT

An annular cutter connecting apparatus includes an arbor, annular cutter fixing locking members received in holding holes formed in the lower end portion of the arbor and a sleeve member surrounding the lower end portion of the arbor, for fixing an annular cutter to the arbor. The sleeve has a first control face having an inner diameter equal to the outer diameter of the lower end portion of the arbor, for projecting the locking members into the central bore by a predetermined length when the first control face engages the locking members, and second control faces formed circumferentially in the first control face, for receiving the locking members. The sleeve is rotatable around its own axis so as to cause the locking members to selectively face the first control face and the second control faces, respectively. An annular cutter has a shank portion provided with locking member passing portion or portions on that part of the outer peripheral surface of the shank portion which corresponds to the holding holes of the annular cutter connecting apparatus. The shank portion has depressed locking member receiving portion formed in or on the locking member passing portion or portions and receive the locking members. The annular cutter is connected to and removed from the arbor in one-touch operation.

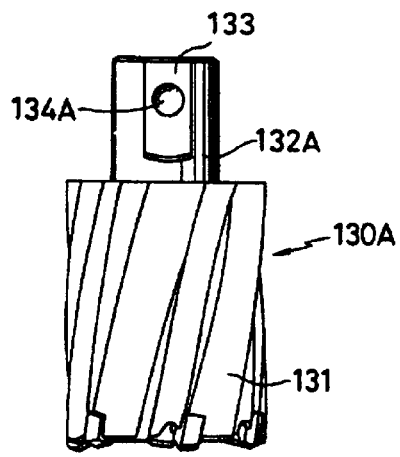

FOREIGN PATENT DOCUMENTS

| | | |
|---|---|---|
| GB | 2 146 923 | 5/1985 |
| GB | 2 257 647 | 1/1993 |
| JP | S39-3491 U | 2/1964 |
| JP | S52-18475 U | 4/1977 |
| JP | S58-17887 P | 4/1983 |
| JP | S60-123239 P | 7/1985 |
| JP | S62-74515 P | 4/1987 |
| JP | S63-140313 U | 9/1988 |
| JP | S64-3603 U | 1/1989 |
| JP | S64-16305 P | 1/1989 |
| JP | H02-111504 U | 9/1990 |
| JP | H04-83515 U | 7/1992 |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

New claims 8–36 are added and determined to be patentable.

8. An annular cutter releasably retained by an arbor which has a cylindrical bore formed therethrough which opens at one end of the arbor, comprising:
  a substantially cylindrical blade portion having one end;
  a shank portion comprising a lateral side and two ends one end of which is coaxially connected to the one end of the blade portion and the other end of which defines a top end to be inserted into the cylindrical bore from the one end of the arbor, the shank portion being of a diameter substantially equal to that of the cylindrical bore,
  the shank portion comprising:
    locking member passing means formed in the lateral side of the shank portion and having entrance portions at the top end of the shank portion which are arranged at the same angular intervals as locking members are provided in the arbor, wherein the locking members are positionable between a first depth position in which the locking members are partially in the cylindrical bore and a second depth position deeper in the cylindrical bore than the first depth position,
    the locking member passing means each at least partially recessed as deep from a periphery of the cylindrical bore as a depth ranging between the first and second depth positions of the locking members in order to allow the entrance portions, if angularly aligned with the locking members, to pass the locking members being held in the first depth position when the shank portion advances in the cylindrical bore;
    a trigger surface configured to abut against a support member placed and urged in the cylindrical bore towards the one end of the arbor, wherein the support member holds the locking members in the first depth position, which are radially urged further into the cylindrical bore towards the second depth position,
    the trigger surface being located in the shank portion such that after the entrance portions of the locking member passing means pass the locking members held in the first depth position, the trigger surface displaces the support member to thereby release the locking members from the support member to permit them to come in urged contact with the locking member passing means, which guide the locking members to travel relatively therealong while the shank portion further advances in the cylindrical bore; and
    depressed locking member receiving portions formed in the side of the shank portion and in or at the locking member passing means, the locking member receiving portions being formed in the side of the shank portion at said angular intervals and each having a bottom recessed at least as deep from the periphery of the cylindrical bore as the second depth position of the locking members, wherein while the shank portion advances in the cylindrical bore, the locking member passing means guide the locking members relatively therealong to the locking member receiving portions, at which the locking members urgedly fall and become trapped in the locking member receiving portions.

9. An annular cutter according to claim 8, wherein the locking member passing means are at least partially flat.

10. An annular cutter according to claim 8, wherein the locking member receiving portions are hemispherical.

11. An annular cutter according to claim 8, wherein the locking member receiving portions are conical.

12. An annular cutter according to claim 8, wherein the locking member receiving portions at least partially overlap the locking member passing means.

13. An annular cutter according to claim 8, wherein the locking member passing means each comprise an area axially running in the lateral side of the shank portion.

14. A annular cutter according to claim 8, wherein the locking member passing means each form a passage to at least one locking member receiving portion.

15. A annular cutter according to claim 8, wherein the top surface of the shank portion comprises the trigger surface.

16. A annular cutter according to claim 8, wherein the locking member receiving portions are formed at the locking member passing means.

17. A combination of an arbor and an annular cutter releasably attached to the arbor,
  (a) the arbor comprising:
    an elongated body comprising a substantially cylindrical bore formed therethrough which opens at one end of the elongated body;
    a plurality of holding holes radially formed in the elongated body at angular intervals;
    locking members each received in a respective holding hole for radial movement therein;
    a sleeve placed around the elongated body for rotation but not axial movement, the sleeve having an inner periphery which comprises:
      first control surfaces formed at the same angular intervals and configured to be abuttable with the locking members when the sleeve is in a first angular position with the arbor, wherein when the sleeve is in the first angular position, the locking members are positionable by the first control surfaces in a first depth position in which the locking member are partially in the cylindrical bore from the holding holes; and
      second control surfaces formed circumferentially continuous from the first control surfaces at the angular intervals and configured to be abuttable with the locking member when the sleeve is in a second angular position with the arbor, wherein when the sleeve is in the second angular position, the locking members are positionable by the second control surfaces in a second depth position deeper in the cylindrical bore than the first depth position,
    a spring adapted to urge the sleeve to rotate towards the second angular position, wherein when the annular cutter is not attached, the spring so urges the sleeve to thereby urge the second control surfaces to rotate relatively towards the locking members and thus urge the locking members further into the cylindrical bore from the first depth position; and a support member placed and urged in the cylindrical bore towards the one end of the arbor, the support member being corroborative with the sleeve to hold the locking members, when the annular cutter is not attached, in the first depth position against the sleeve urging the locking members further into the cylindrical bore to thereby retain the sleeve in the first angular position, and (b) the annular cutter comprising:

a substantially cylindrical blade portion having one end:

a shank portion comprising a lateral side and two ends one end of which is coaxially connected to the one end of the blade portion and the other end of which defines a top end to be inserted into the cylindrical bore from the one end of the arbor, the shank portion being of a diameter substantially equal to that of the cylindrical bore, the shank portion comprising:

*locking member passing means formed in the lateral side of the shank portion and having entrance portions at the top end of the shank portion which are arranged at the same angular intervals, the locking member passing means each at least partially recessed as deep from a periphery of the cylindrical bore as a depth ranging between the first and second depth positions of the locking member in order to allow the entrance portions, if angularly aligned with the locking members, to pass the locking members being held in the first depth position when the shank portion advances in the cylindrical bore;*

*a trigger surface configured to abut against the support member, the trigger surface being located in the shank portion such that after the entrance portions of the locking member passing means pass the locking members held in the first depth position, the trigger surface displaces the support member to thereby release the locking members from the support member to permit them to come in urged contact with the locking member passing means, which guide the locking members to travel relatively therealong while the shank portion further advances in the cylindrical bore; and*

*depressed locking member receiving portions formed in the side of the shank portion and in or at the locking member passing means, the locking member receiving portions being formed in the side of the shank portion at said angular intervals and each having a bottom recessed at least as deep from the periphery of the cylindrical bore as the second depth position of the locking members, wherein while the shank portion advances in the cylindrical bore, the locking member passing means guide the locking members relatively therealong to the locking member receiving portions, at which the locking members urgedly fall and become trapped in the locking member receiving portions and the sleeve automatically rotates to the second angular position in which the second control surfaces hold the locking members in the second depth position.*

18. *A combination according to claim 17, wherein the locking members comprise balls.*

19. *A combination according to claim 17, wherein the holding holes each comprise a tapered periphery.*

20. *A combination according to claim 17, wherein the locking member passing means are at least partially flat.*

21. *A combination according to claim 17, wherein the locking member receiving portions are hemispherical.*

22. *A combination according to claim 17, wherein the locking member receiving portions are conical.*

23. *A combination according to claim 17, wherein the locking member receiving portions at least partially overlap the locking member passing means.*

24. *A combination according to claim 17, wherein the locking member passing means each comprise an area axially running in the lateral side of the shank portion.*

25. *A combination according to claim 17, wherein the locking member passing means each form a passage to at least one locking member receiving portion.*

26. *A combination according to claim 17, wherein the top surface of the shank portion comprises the trigger surface.*

27. *A combination according to claim 17, wherein the locking member receiving portions are formed at the locking member passing means.*

28. *A method of producing the annular cutter of claim 8 releasably retainable by an arbor which has a cylindrical bore formed therethrough which opens at one end of the arbor, comprising:*

*forming a substantially cylindrical blade portion having one end;*

*forming a shank portion comprising a lateral side and two ends one end of which is coaxially connected to the one end of the blade portion and the other end of which defines a top end to be inserted into the cylindrical bore from the one end of the arbor, the shank portion being of a diameter substantially equal to that of the cylindrical bore;*

*forming locking member passing means in the lateral side of the shank portion which have entrance portions at the top end of the shank portion which are arranged at the same angular intervals as locking members are provided in the arbor, wherein the locking members are positionable between a first depth position in which the locking members are partially in the cylindrical bore and a second depth position deeper in the cylindrical bore that the first depth position,*

*the locking member passing means each at least partially recessed as deep from a periphery of the cylindrical bore as a depth ranging between the first and second depth positions of the locking members in order to allow the entrance portions, if angularly aligned with the locking members, to pass the locking members being held in the first depth position when the shank portion advances in the cylindrical bore;*

*forming a trigger surface in the shank which is configured to abut against a support member placed and urged in the cylindrical bore towards the one end of the arbor, wherein the support member holds the locking members in the first depth position, which are radially urged further into the cylindrical bore towards the second depth position,*

*the trigger surface being located in the shank portion such that after the entrance portions of the locking member passing means pass the locking members held in the first depth position, the trigger surface displaces the support member to thereby release the locking members from the support member to permit them to come in urged contact with the locking member passing means, which guide the locking members to travel relatively therealong while the shank portion further advances in the cylindrical bore; and*

*forming depressed locking member receiving portions in the side of the shank portion and in or at the locking* member passing means, the locking member receiving portions being formed in the side of the shank portion at said angular intervals and each having a bottom recessed at least as deep from the periphery of the cylindrical bore as the second depth position of the locking members, wherein while the shank portion advances in the cylindrical bore, the locking member passing means guide the locking members relatively therealong to the locking member receiving portions, at which the locking members urgedly fall and become trapped in the locking member receiving portions.

29. A method according to claim 28, wherein forming locking member passing means comprises forming locking member passing means at least partially flat.

30. A method according to claim 28, wherein forming locking member receiving portions comprises forming locking member receiving portions in a hemispherical shape.

31. A method according to claim 28, wherein forming locking member receiving portions comprises forming locking member receiving portions in a conical shape.

32. A method according to claim 28, wherein forming locking member receiving portions comprises forming locking member receiving portions in the side of the shank such that they at least partially overlap the locking member passing means.

33. A method according to claim 28, wherein forming locking member passing means comprises forming locking member passing means having an area axially running in the side of the shank portion.

34. A method according to claim 28, wherein forming locking member receiving portions comprises forming locking member receiving portions to each form a passage to at least one locking member receiving portion.

35. A method according to claim 28, wherein forming trigger surface comprises forming trigger surface at the top surface of the shank portion.

36. A method according to claim 28, wherein forming the locking member receiving portions comprises forming locking member receiving portions at the locking member passing means.

\* \* \* \* \*